United States Patent
Baumgartner et al.

(10) Patent No.: US 6,567,240 B2
(45) Date of Patent: May 20, 2003

(54) DISK DRIVE PLATTER USING SPUTTER SHADOWS THEREON FOR DETERMINING ORIENTATION THEREOF

(75) Inventors: Bradley Frederick Baumgartner, Los Banos, CA (US); Andrew John Buhler, San Jose, CA (US); Erich Chuh, San Mateo, CA (US); Hang Fai Ngo, San Jose, CA (US); Alma Lujan Ortega-Avery, San Jose, CA (US); Bob C. Robinson, Hollister, CA (US); Song How Wong-Jessel, San Jose, CA (US); Elmer Tyree York, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 09/793,236

(22) Filed: Feb. 26, 2001

(65) Prior Publication Data

US 2002/0118630 A1 Aug. 29, 2002

(51) Int. Cl.[7] ................................................. G11B 5/82
(52) U.S. Cl. ..................................................... 360/135
(58) Field of Search ................................. 360/135, 133

(56) References Cited

U.S. PATENT DOCUMENTS 4,558,388 A  * 12/1985  Graves ........................ 360/135

* cited by examiner

Primary Examiner—A. J. Heinz
(74) Attorney, Agent, or Firm—Robert B. Martin; Bracewell & Patterson, L.L.P.

(57) ABSTRACT

A disk for a disk drive uses a circular platter having first and second sides and a circumferential edge. The circumferential edge of the disk has four symmetrically spaced apart shadows and a fifth or additional shadow that gives the disk an asymmetrical shadow signature. The fifth shadow is offset relative to the other shadows, which have congruent arcuate lengths and separation. The fifth shadow has an arcuate length that is about half as long as those of the other shadows, and is closely spaced adjacent to one of the other shadows. The asymmetric shadow signatures of the disk is used to precisely determine both the circumferential position of the platters and their planar orientation (i.e., A-side or B-side). For example, when the disk is mounted on a tool spindle and rotated, an optical detector detects the pattern of the shadows and feeds the data to a computer system. The rotational position of the spindle also is relayed to the computer for coordinating the processing of the rotating disk. When the disk is mounted on a different tool, the same shadow signature is used to determine its planar and angular positions.

12 Claims, 2 Drawing Sheets

DISK DRIVE PLATTER USING SPUTTER SHADOWS THEREON FOR DETERMINING ORIENTATION THEREOF

BACKGROUND OF THE INVENTION

1. Technical Field

The present invention relates in general to an improved disk drive, and in particular to an improved means of identifying the planar orientation and rotational position of disks in a disk drive.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Typically, one or more disks are stacked vertically on a common spindle that is turned by a disk drive motor at several thousand revolutions per minute (rpm).

Disks are rigid platters that are usually made of aluminum alloy, plastic, glass, or ceramic, and are covered with a magnetic coating on each side or surface (i.e., "A-side" and "B-side"). During the fabrication of the platters, grippers (at least three, but usually four) are used to grip each platter along its outer circumferential edge. The grippers are symmetrically spaced apart from each other around the perimeter of the platter as the various manufacturing processes, such as sputtering, are performed on the platter. When the grippers release the platter after sputtering, tool marks or "shadows" along the disk outer edge where the sputtering was prevented from contacting the disk are present.

The only other moving part within a typical HDD is the head stack assembly. Within most HDDs, one magnetic read/write head or slider is associated with each side of each platter and flies just above or below the platter's surface. Each read/write head is mounted on a suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

In the prior art, each tool used in the disk manufacturing process has its own unique machine index for circumferentially referencing the disks. The machines indices are referenced from the A and B sides of each platter. Thus, when a disk is transferred, for example, from a manufacturing tool to a test tool, the two different tools utilize different machine indexes. Whatever circumferential disk reference the manufacturing tool utilized is lost when the disk is transferred to the test tool. This loss of information is repeated at each tool change. Moreover, information pertaining to only one of the A and B sides also may be lost if the disk is inverted. Thus, an improved means of identifying the rotational position and planar orientation of disks is needed.

SUMMARY OF THE INVENTION

One embodiment of a disk for a hard disk drive uses a circular platter having first and second sides and a circumferential edge. The circumferential edge of the disk has four symmetrically spaced apart shadows and a "fifth" or additional shadow, thereby giving the disk an asymmetrical shadow signature. The fifth shadow is offset relative to the other shadows, which have congruent arcuate lengths and separation. The fifth shadow has an arcuate length that is about half as long as those of the other shadows, and is closely spaced adjacent to one of the other shadows.

The asymmetric shadow signatures of the disk is used to precisely determine both the circumferential position of the platters and their planar orientation (i.e., A-side or B-side). For example, when the disk is mounted on a tool spindle and rotated, an optical detector detects the pattern of the shadows and feeds the data to a computer system. The rotational position of the spindle also is relayed to the computer for coordinating the processing of the rotating disk. When the disk is mounted on a different tool, the same shadow signature is used to determine its planar and angular positions.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
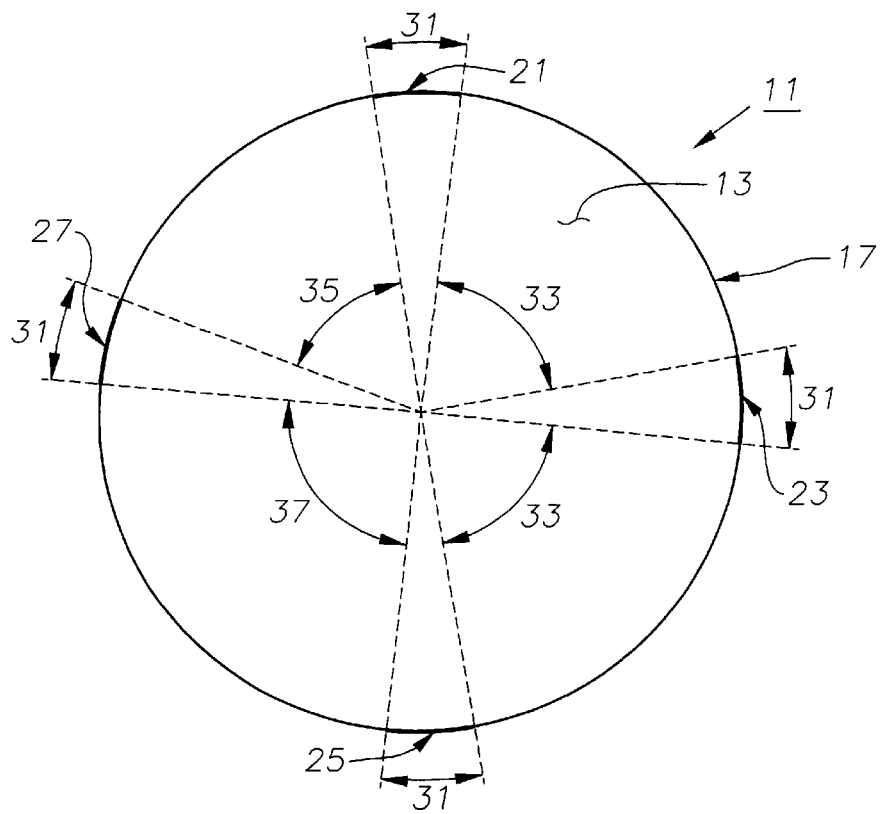
FIG. 1 is a plan view of a first embodiment of a hard drive disk constructed in accordance with the present invention.

Referring to FIG. 1, a first embodiment of a disk 11 constructed in accordance with the present invention is shown. Disk 11 is a circular platter having a first or "A" surface or side 13, and a second or "B" side 15 (not shown) located opposite side 13. Disk 11 has a thickness that defines a perimeter or outer circumferential edge 17 that is substantially perpendicular to the planes defined by sides 13, 15. During manufacturing and processing, disk 11 was restrained by a gripping mechanism (not shown) having four grippers that engaged disk 11 exclusively at circumferential edge 17. Although four grippers were used to retrain disk 11, more or fewer grippers also may be used. Unlike prior art grippers, the grippers used to restrain disk 11 are asymmetrically spaced apart from each other about circumferential edge 17. Thus, when disk 11 was sputtered and the grippers were removed, four tooling marks or "shadows" 21, 23, 25, 27 were left on circumferential edge 17 giving disk 11 an asymmetrical "shadow signature."

In the embodiment shown, it is tooling mark or shadow 27 that is asymmetric or offset relative to the other shadows 21, 23, 25. Those skilled in the art will recognize that there are many other ways to make the shadows asymmetric. Shadows 21, 23, 25 have congruent arcuate lengths 31 (approximately 10 degrees) and spaced apart from each other by arcs 33 (approximately 80 degrees). Although shadow 27 also has an arcuate length 31 of approximately 10 degrees, shadow 27 is spaced apart from shadow 21 by arc 35 (approximately 70 degrees) and from shadow 25 by arc 37 (approximately 90 degrees). In an alternate embodiment, the arcuate length of shadow 27 may be varied from the arcuate lengths of shadows 21, 23, 25.

Figure 2:
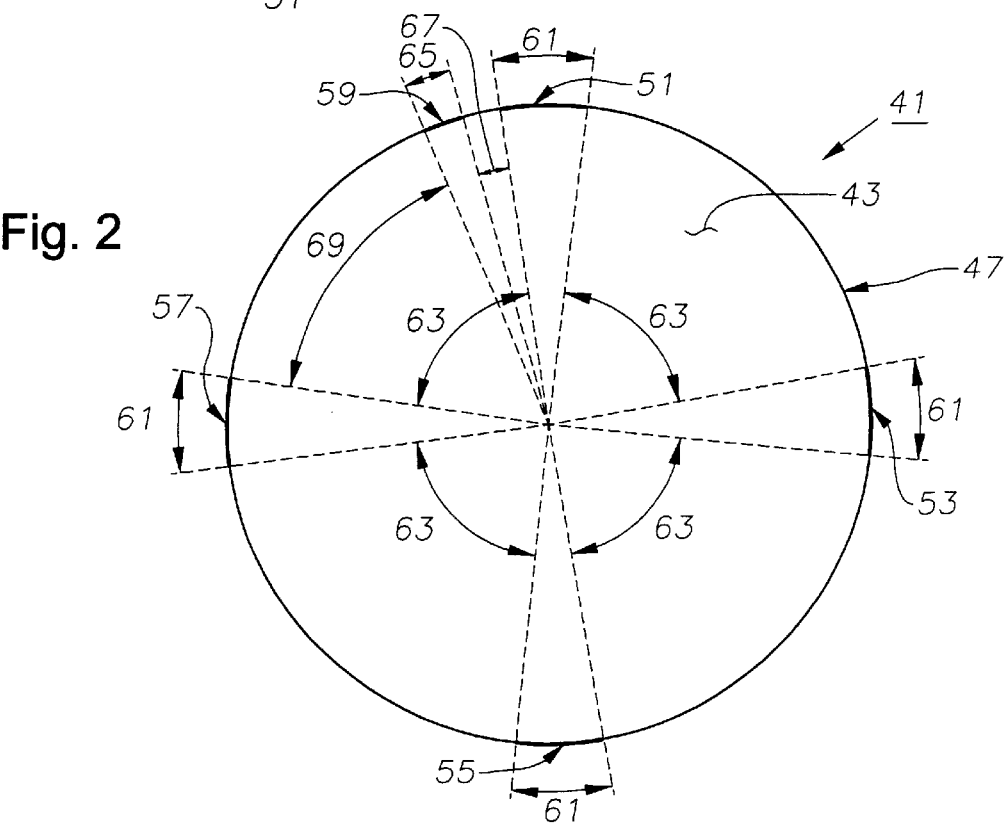
FIG. 2 is a plan view of a second embodiment of a hard drive disk constructed in accordance with the present invention.

Referring now to FIG. 2, a second embodiment of a disk 41 constructed in accordance with the present invention is shown. Like disk 11, disk 41 is a circular platter having first and second sides 43, 45 and a circumferential edge 47. However, disk 41 has four symmetrically spaced apart shadows 51, 53, 55, 57, and a "fifth" or additional shadow 59, giving disk 41 an asymmetrical shadow signature. Fifth shadow 59 may be formed on disk 41 in different ways, including the use of a fifth gripper, masking, etc.

Fifth shadow 59 is asymmetric or offset relative to the other shadows 51, 53, 55, 57, which have congruent arcuate lengths 61 (approximately 10 degrees), and are spaced apart from each other by arcs 63 (approximately 80 degrees). Fifth shadow 59 has an arcuate length 65 that differs substantially from lengths 61. In the preferred embodiment, length 65 is either twice as long (i.e. 20 degrees) or half as long (i.e., 5 degrees) as length 61. As shown in FIG. 2, length 65 is half as long as length 61. Fifth shadow 59 is spaced apart from shadow 61 by arc 67 (approximately 5 degrees) and from shadow 57 by arc 69 (approximately 70 degrees).

In operation (FIG. 3), the asymmetric shadow signatures of disks 11, 41 are used to precisely determine both the circumferential position of the platters and their planar orientation (i.e., A-side or B-side). For example, when disk 41 is mounted on a tool spindle 71 and rotated therewith, optical detection means 73, such as a video camera detects the pattern or signature of shadows 51, 53, 55, 57, 59. Optical detection means 73 feeds this data to a computer system 75 having a decoder 77. The rotational position of spindle 71 (PLL) or a clock is relayed to circuitry 77 for coordinating the process of shadow signature recognition for the rotating disk 41. When disk 41 is mounted on a different tool, the same shadow signature of disk 41 can be used to determine its angular or rotational position. The shadow signature on disk 11 gives it the same capability.

Figure 3:
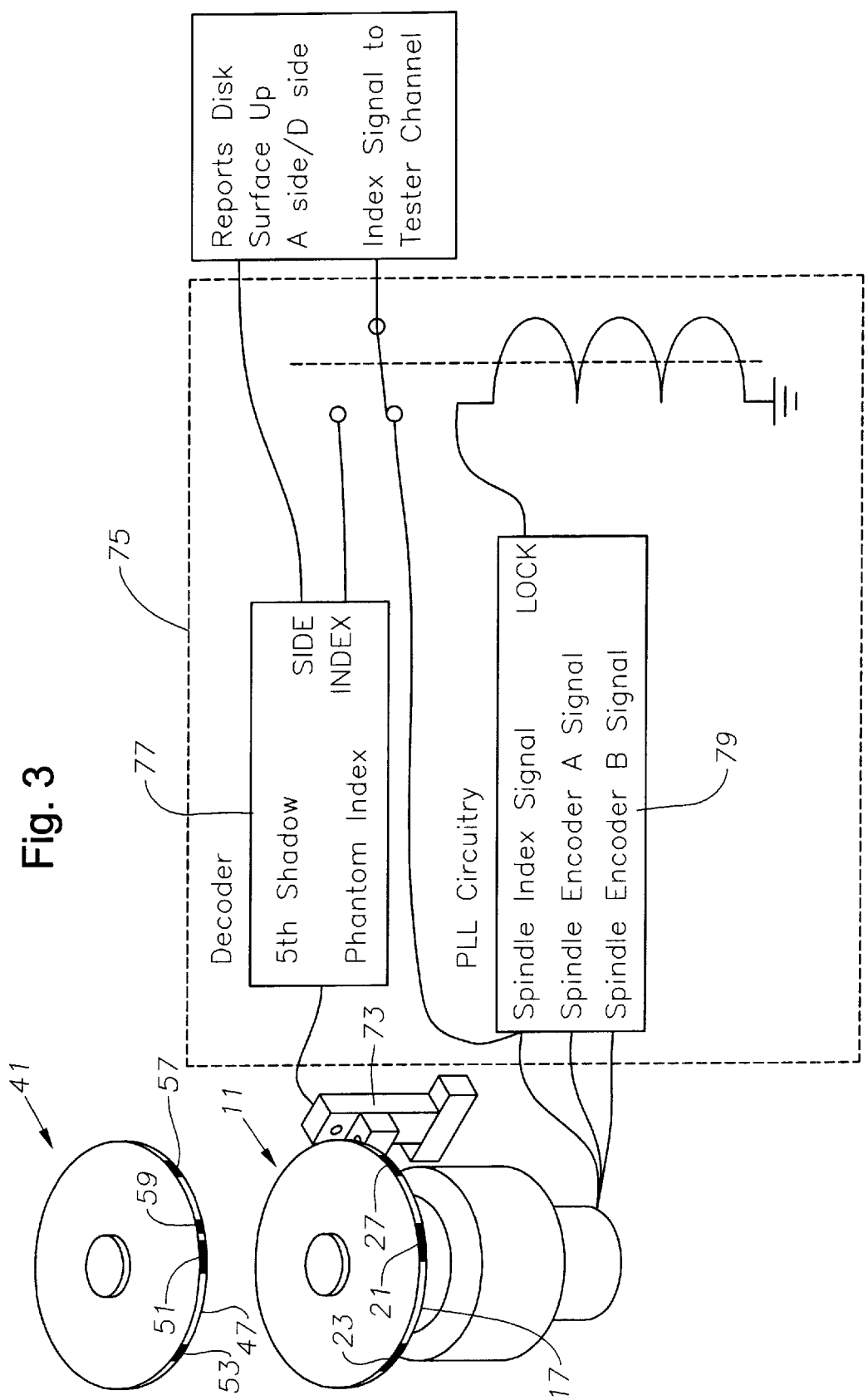
FIG. 3 is a schematic diagram of the disks of FIGS. 1 and 2 and a system for detecting and interpreting their shadow signatures.

The planar orientation of disk 41 is determined by detecting whether fifth shadow 59 is trailing or leading shadow 51. In FIG. 3, if disk 41 is spinning clockwise and fifth shadow 59 is trailing shadow 51, then A-side 43 is "up." If fifth shadow 59 is leading shadow 51 under the same circumstances, B-side 45 is up. Similarly, the angular position of an element, defect, data, etc. on disk 41 is determined by detecting the position of the element relative to the rotational position of fifth shadow 59. The planar orientation and angular position of disk 11 is determined in an analogous manner.

The present invention has several advantages. Using asymmetrical tooling marks or shadow signatures on the circumferential edge of a disk gives the disk a disk index that stays with the disk no matter which tool it is mounted to. All tools that subscribe to the disk index reference the same tooling marks. The disk index also can be used outside of disk component manufacturing, such as circumferential referencing during servo write processes. With appropriate visual detection equipment, the tooling marks provide rotational accuracy capabilities equal to the visual detection equipment used.

While the invention has been shown or described in only some of its forms, it should be apparent to those skilled in the art that it is not so limited, but is susceptible to various changes without departing from the scope of the invention. For example, applications for the present invention include magnetic, glide, and optical disks.

What is claimed is:

1. A disk for a hard disk drive, comprising:
   a platter having first and second opposed surfaces that define a planar orientation of the platter, and a circumferential outer edge extending between the first and second opposed surfaces;
   an array of shadows on the platter; and
   an asymmetric shadow on the platter that is asymmetric to the array of shadows, wherein a relative position of the asymmetric shadow is used to determine both the planar orientation of the platter, and a rotational position of the platter relative to an element thereon.

2. The disk of claim 1 wherein the shadows in the array of shadows are symmetrically spaced apart.

3. The disk of claim 1 wherein the asymmetric shadow is offset from one of the shadows in the array of shadows.

4. The disk of claim 1 wherein the array of shadows comprises three shadows.

5. The disk of claim 1 wherein the array of shadows comprises four shadows.

6. The disk of claim 1 wherein each of the shadows is a tooling mark.

7. The disk of claim 1 wherein the asymmetric shadow has an arcuate length that is approximately twice as long as an arcuate length of each of the shadows of the array of shadows.

8. The disk of claim 1 wherein the array of shadows and the asymmetric shadow are located on the outer edge of the platter.

9. A disk for a hard disk drive, comprising:
   a platter having first and second opposed surfaces that define a planar orientation of the platter, and a circumferential outer edge extending between the first and second opposed surfaces;
   a symmetrically spaced apart array of tooling marks that form shadows on the outer edge of the platter; and
   an asymmetric shadow on the outer edge of the platter that is offset from one of the shadows in the array of shadows, wherein a relative position of the asymmetric shadow is used to determine both the planar orientation of the platter, and a rotational position of the platter relative to an element thereon.

10. The disk of claim 9 wherein the shadows comprise three shadows.

11. The disk of claim 9 wherein the shadows comprise four shadows.

12. The disk of claim 9 wherein the asymmetric shadow has an arcuate length that is approximately twice as long as an arcuate length of each of the shadows.

* * * * *